United States Patent Office 3,502,866
Patented Mar. 24, 1970

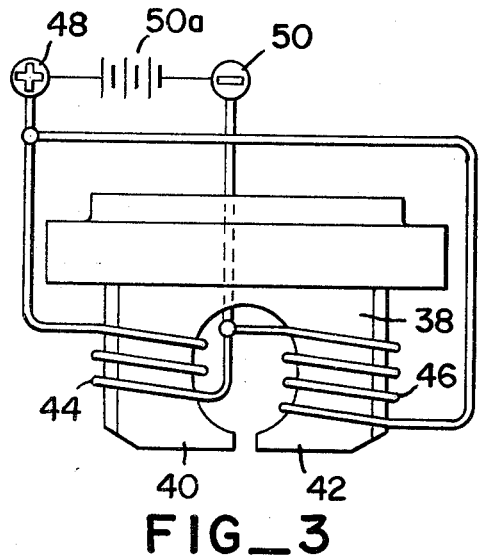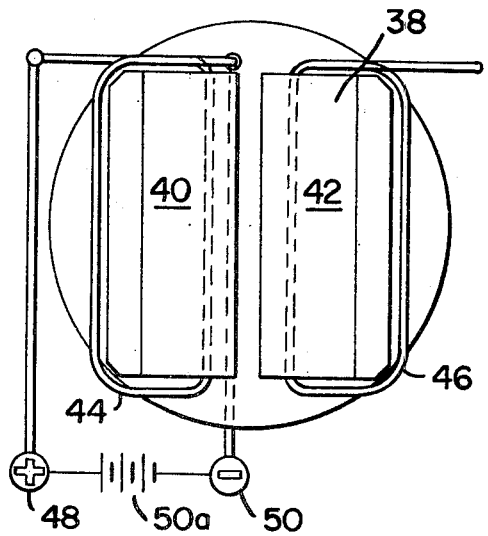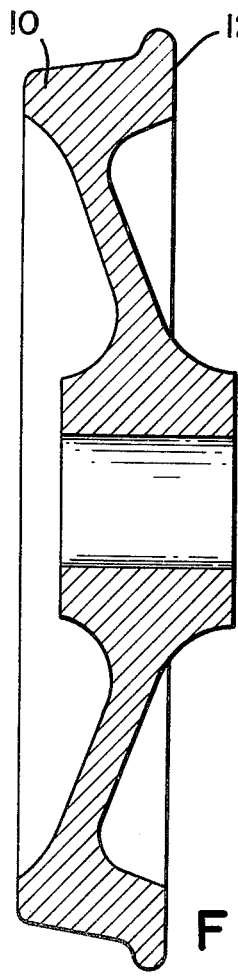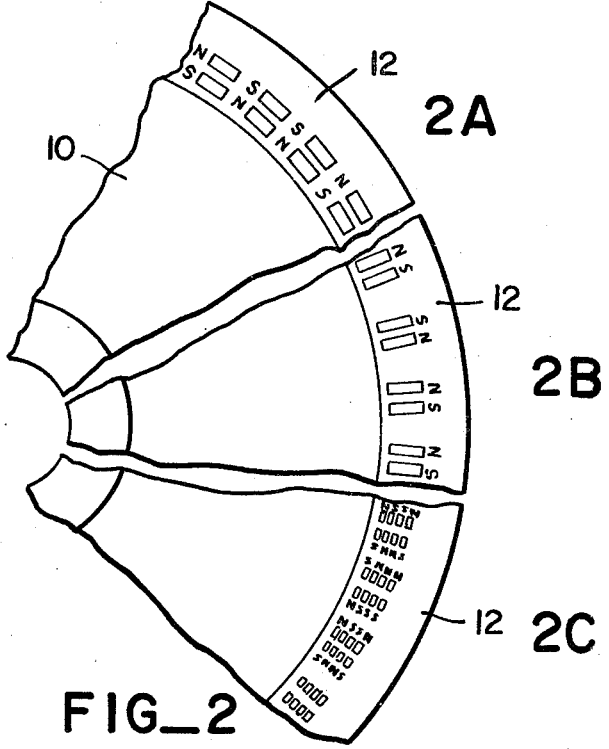

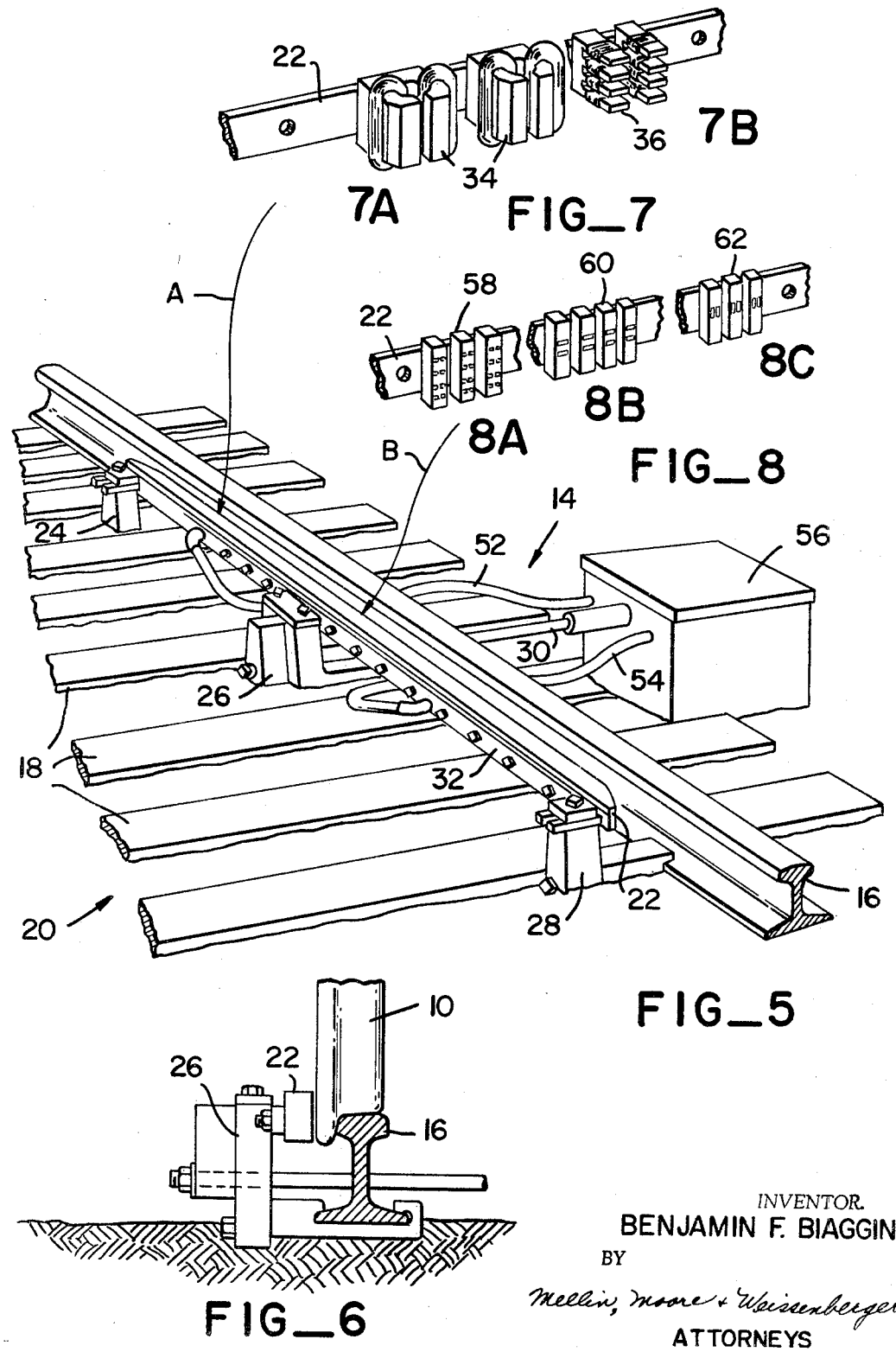

3,502,866
APPARATUS FOR MARKING RAILROAD WHEELS
AND DETECTING SUCH MARKING
Benjamin F. Biaggini, 1170 Sacramento St.,
San Francisco, Calif. 94108
Filed July 24, 1967, Ser. No. 655,594
Int. Cl. B61l 27/00, 3/12
U.S. Cl. 246—2                                                1 Claim

ABSTRACT OF THE DISCLOSURE

Apparatus for marking a magnetically permeable railroad wheel on a track and detecting that marking which includes a series of electromagnets placed at trackside adjacent the path of the travel of the wheel on the track, each electromagnet thereby impressing magnetism on a portion of the railroad wheel, each electromagnet being variable in polarity so that the resulting polarity of each portion rendered magnetic can be chosen, and sensing means for detecting the presence and polarity of each magnetic portion of the railroad wheel.

BACKGROUND OF THE INVENTION

This invention relates to apparatus for marking railroad wheels and detecting such marking, and more particularly, to apparatus wherein such marking is achieved by impressing magnetism into portions of a railroad wheel. This invention also relates to a method of controlling railroad vehicles by means of such marking and detecting apparatus.

With the widespread use of computers in railroad operation, there is increasing need for an apparatus which can automatically identify locomotives, cars, and other equipment. Obviously, this apparatus must be capable of marking a car in some manner, and detecting or reading-out such marking so that the car can be identified. Furthermore, since railroad vehicles are subject to substantial weathering, it is highly desirable that the apparatus and its marks not be affected by weather, and since marks must be changed at intermittent periods, it is also desirable that such marks be easily erasable. Finally, of course, the device should be simple and efficient, so that it operates effectively over a substantial period of time.

Applicant's invention fulfills these objects by providing apparatus for marking railroad wheels and detecting such markings which is simple and efficient, in which weathering does not affect the marking, and in which those markings are easily and effectively erased. Applicant's invention also fulfills the need for a method of controlling railroad vehicles by means of such marking and detecting which is readily adaptable to the computerized systems used in today's railroads.

SUMMARY OF THE INVENTION

Broadly stated, applicant's apparatus for marking a magnetically permeable railroad wheel on a track and detecting such marking comprises a plurality of electromagnets fixed relative to the track adjacent the path of the railroad wheel as it passes thereon, each electromagnet thereby rendering magnetic a portion of the railroad wheel, each electromagnet being variable in polarity so that the resulting polarity of the portion rendered magnetic can be chosen. Means are included for detecting the presence and polarity of each magnetic portion of the railroad wheel. Broadly stated, applicant's method of controlling railroad vehicles comprises the steps of applying a plurality of magnetic fields of chosen polarity to a magnetically permeable wheel of the vehicle to thereby render portions of the wheel magnetic and detecting the presence and polarity of each magnetic portion of the wheel.

BRIEF DESCRIPTION OF THE DRAWINGS

A preferred embodiment of the invention is included, wherein,

FIG. 1 is a cross section of a railroad wheel;

FIGS. 2, 2A, 2B and 2C are partial side elevations of the railroad wheel with various magnetic marking patterns indicated thereon;

FIG. 3 is a plan view of a type of electromagnet used for making the wheel;

FIG. 4 is a front elevation of the electromagnet of FIG. 3;

FIG. 5 is a perspective view of a trackside installation which may be adapted to apply magnetic marking to the wheel or detect magnetic marking on the wheel;

FIG. 6 is a cross section of the trackside installation of FIG. 5;

FIGS. 7, 7A and 7B are perspective views of a series of electromagnets used for marking the wheel in the installation of FIG. 5;

FIGS. 8, 8A, 8B and 8C are perspective views of the device for detecting the markings applied by the installation of FIG. 5.

DESCRIPTION OF THE PREFERRED EMBODIMENT

Referring first to FIG. 1, a railroad wheel 10 is shown in cross section. Wheel 10 is of normal steel construction and is thus magnetically permeable. In this particular embodiment of the invention, the marking of a wheel 10 is done on the back-face 12, although it could be done on any other surface thereof. Samples of such marking are shown in FIG. 2. How they are produced will be explained in detail later.

In FIG. 5, the complete installation of the marking portion of the apparatus is shown at 14. Rail 16 is fixed to tie 18 to form part of track 20. A bar 22 is held substantially parallel to rail 16 on the inside thereof by suitable supports 24, 26, 28, 30 and bracket 32. Mounted along the length of the bar 22 (arrow A) is a series of electromagnets 34 (as shown in FIG. 7a), or 36 (as shown in FIG. 7b), or of any configuration chosen. These are electromagnets of the well-known type, and the form shown in FIG. 7a is shown more clearly in FIGS. 3 and 4. Such an electromagnet 34 includes a laminated soft iron core 38 forming pole pieces 40 and 42 with windings 44 and 46 about those pole pieces respectively, and connections to positive and negative terminals 48 and 50 through, for example, battery 50A. When the connections to terminals 48 and 50 are so made, magnetism of a certain polarity in the electromagnet 34 results.

These connections are made through cables 52 and 54 which terminate in control box 56.

The detection portion of the apparatus is quite similar in structure to the marking device 14, and hence FIG. 5 may be referred to again, with certain variations. Instead of electromagnets, a series of magnetic flux detectors 58, 60 or 62, as shown in FIGS. 8a, 8b, and 8c, are mounted along bar 22 (arrow B), with suitable cables 52, 54, and a control box 56 containing interrogation and other equipment for retrieval of magnetic signals and transmission of them to external devices for further handling of the information received.

In the operation of the apparatus, it has been found desirable to erase any residual magnetism from the wheel to be marked, or to saturate the wheel with magnetic flux to provide a uniform magnetic state therein. This means that variations in the state can be applied by the apparatus without interference from residual magnetism that may exist in the wheel.

The electromagnets 34 of the marking portion 14 are then activated and a railroad wheel 10 is rolled on track 20 past bar 22. As shown in FIG. 6, the face 12 of the wheel 10 comes in close proximity to the pole pieces 40, 42 of the electromagnets 34 mounted to bar 22. The electromagnets 34, in such close proximity to a magnetically permeable mass, each render a portion of the railroad wheel magnetic, with a polarity corresponding to the polarity of the electromagnet 34 itself. The size and spacing of the magnetic portions which result from use of electromagnets of the type shown in FIG. 7a are shown in FIG. 2b. If electromagnets of the type shown in FIG. 7b are used, the resulting configuration of magnetic portions will be that shown in FIG. 2c. It is clear, then, that the size, shape and spacing of the magnetic portions are determined by the size, shape and spacing of pole faces 40 and 42. It is also seen that the polarities of pole faces 40 and 42 of each electromagnet 34 may be switched, and thus the polarities of the portions rendered magnetic may be chosen.

In order to identify a certain car after one of its wheels 10 has been marked as described above, the wheel 10 of that car is rolled over track 16 and past the detecting portion of the apparatus. The magnetic flux detectors 58, 60 or 62, chosen in number, spacing and array to correlate with the number, spacing and array of the portions of the wheel 10 rendered magnetic (which in turn is determined by the configuration of pole pieces 40 and 42 and the number and spacing of electromagnets 34), detect the presence and polarity of those portions and transmit the information to internal devices.

Since each electromagnet 34 is separately energizable, an effective coding system can be achieved by choosing the sequence of polarity of the magnetic portions of the wheel 10. Before a wheel 10 is passed through the marking apparatus, the operator can choose the polarity of each individual marking electromagnet 34. This "north-south" or "south-north" polarity can be used as the basis of a simple binary code, so that an intelligible signal can be impressed upon the wheel. After a given wheel 10 has been so marked, the operator of the marking apparatus can easily change the polarities of certain electromagnets 34, so that another and different intelligible signal can be impressed on another wheel 10. Through use of such a binary code, the operator of the detecting apparatus may detect the signal impressed on any wheel 10, and may make use of any information which a signal holds.

The identifying signal can relate to car identification, type of lading, identity of shipper, identity of consignee, weight of lading, and the like.

The bar 22 may with advantage be of length sufficient to permit the entire back-face 12 of the wheel 10 to pass in proximity to electromagnets 34, so that the portions of the wheel 10 rendered magnetic extend about substantially the complete circumference of the wheel 10. The detecting portion of the apparatus will, of course, be of like dimension, so that it is capable of detecting all of the magnetic portions impressed on the wheel 10.

Both the marking portion and detecting portion of the apparatus can easily be adapted to function when the vehicle to be marked is at rest.

It is clear that multiple installations of the apparatus can be used to mark more than one wheel of any vehicle.

The system described herein can be adapted to mark and detect virtually any magnetically permeable object, or virtually any nonmagnetically permeable object equipped with a magnetically permeable tag, label or coating.

When used in conjunction with railroad or other vehicles, the marked information can be used to control, for example, the movement and direction of those vehicles. The information can also be used in relation to storage or inventory control of vehicles, containers on conveyor belts, and the like.

Applicant has provided apparatus for marking railroad wheels and detecting such marking which is simple and efficient, in which weathering does not affect the markings, and in which those markings are easily and effectively erased. Obviously, the invention can be carried out in many ways, of which the embodiment is merely illustrative.

Having thus described my invention, I claim:

1. Apparatus for marking a magnetically permeable railroad wheel on a track and detecting such marking comprising:
   (a) a plurality of electromagnets fixed relative to the track adjacent the path of the railroad wheel as it passes thereon, each electromagnet comprising a pair of pole faces of opposite polarity, each electromagnet thereby rendering magnetic a portion of the railroad wheel corresponding to the polarity of the pole faces thereof, such polarity being variable to vary the polarity of the portion rendered magnetic;
   (b) means for detecting the presence and polarity of each magnetic portion of the railroad wheel, comprising a plurality of magnetic flux detectors, fixed relative to the track adjacent the path of the railroad wheel as it passes thereon, said magnetic flux detectors being spaced to correlate with the number and spacing of the electromagnets;
   (c) wherein the portion of the wheel rendered magnetic is on the back face thereof.

References Cited

UNITED STATES PATENTS

| | | | |
|---|---|---|---|
| 2,628,572 | 2/1953 | Le Goff | 104—88 |
| 2,981,830 | 4/1961 | Davis et al. | 246—2 |
| 3,016,456 | 1/1962 | Corporon | 246—2 |
| 3,168,268 | 2/1965 | Bossart et al. | 246—2 |
| 3,215,820 | 11/1965 | Heard | 246—2 X |

DRAYTON E. HOFFMAN, Primary Examiner

U.S. Cl. X.R.

246—182; 104—88